(12) United States Patent
Lüchinger

(10) Patent No.: US 6,354,339 B2
(45) Date of Patent: Mar. 12, 2002

(54) APPARATUS FOR DISPENSING MEASURED DOSES OF BULK MATERIAL INTO CONTAINERS WITH NARROW OPENINGS

(75) Inventor: Paul Lüchinger, Uster (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 09/822,277

(22) Filed: Apr. 2, 2001

(30) Foreign Application Priority Data

Apr. 6, 2000 (CH) .............................. 0683/00

(51) Int. Cl.$^7$ ............................. B65B 1/30; B65B 3/26
(52) U.S. Cl. ........................... 141/83; 141/94; 141/255
(58) Field of Search ........................... 141/83, 94, 196, 141/250, 255

(56) References Cited

U.S. PATENT DOCUMENTS 4,696,329 A * 9/1987 Izzi ................................. 141/1
5,143,126 A * 9/1992 Boesch et al. ................. 141/1
5,656,325 A * 8/1997 Wallace ......................... 427/8

FOREIGN PATENT DOCUMENTS

| DE | 2923672 | 12/1980 |
|---|---|---|
| EP | 0406164 A1 | 6/1990 |
| FR | 2365107 | 4/1978 |
| FR | 2663008 | 12/1991 |

* cited by examiner

Primary Examiner—Timothy L. Maust
(74) Attorney, Agent, or Firm—Burns, Doane, Swecker & Mathis, LLP

(57) ABSTRACT

A dispensing apparatus for granular or powdery bulk materials includes a balance (15) to weigh the doses of material being dispensed, a reservoir container (1), and a cover (2) to close the downward-facing opening of the storage container (1). Integrated in the cover (2) is a conveying and delivering device with a vertically movable, rotary conveyor body (5) designed so that it can substantially close off the dispensing outlet (14) for the bulk material. The conveyor body has a ring-shaped bottom (6) sweeping a ring-shaped conveyor channel (7) that is recessed in the cover (2). The outlet (14) is arranged in the ring-shaped channel (7) and is designed to deliver a directed and locally concentrated stream of bulk material.

25 Claims, 4 Drawing Sheets

APPARATUS FOR DISPENSING MEASURED DOSES OF BULK MATERIAL INTO CONTAINERS WITH NARROW OPENINGS

BACKGROUND OF THE INVENTION

The present invention relates to a dispensing apparatus for dispensing precisely measured doses of dry and/or powdery bulk materials—toxic substances in particular—into small containers that are placed on a balance. The bulk materials are dispensed from a reservoir container by means of a conveying and delivering device.

Dispensing apparatus for dry and/or powdery bulk materials such as, e.g., color dyes, are known and used in practice. A device of this kind is described in EP-A 0 406 164, consisting of a dispensing container with a substantially closable outlet at its underside and a balance onto which the bulk material can be dispensed by a conveyor means. The closure is provided by a tapered valve body, wide at the bottom and narrow at the top, that can be moved downward in the vertical direction. The tapered valve body, which rotates when in its open state, is equipped with means for advancing the bulk material towards the outlet opening.

The device of the foregoing description is not well suited for dispensing bulk material into containers that have openings of narrow cross-section. The widening taper of the valve body towards the outlet opening, combined with the effect of the rotation, imparts a radial, horizontal velocity component to the material particles as they leave the outlet, thereby causing the material to be scattered over a range that can go outside the cross-section of an even relatively wide opening of a receiving container. Consequently, it is not always possible to avoid the loss of bulk material, or even the contamination of the surrounding area, when dispensing material into containers with a narrower opening than the ring-shaped outlet gap. Possibly, this may add a costly clean-up step to the dispensation process.

A costly cleaning process—particularly when toxic powders are dispensed—can also be necessitated by the aforementioned dispensing apparatus itself, particularly in the area of the valve and the outlet, but also in the dispensing container itself, given that a driving shaft runs inside it. Because of the driving shaft, the dispensing container of the known device has to be of a specialized, expensive design that is specifically adapted to the purpose of dispensing doses of the container contents. The arrangement of the shaft can also interfere with the process of filling the dispensing container before the actual dispensing operation is started.

OBJECTIVE AND SUMMARY OF THE INVENTION

Therefore, the objective of the invention is to provide a device for dispensing dosage quantities of bulk material in a directed stream without spillage losses into containers with openings of narrow cross-section and to meet the additional requirements that the device be efficient to clean and easy to handle.

The dispensing apparatus for bulk materials, primarily substances of powdery consistency, comprises a balance receiving the material that is to be apportioned into dosage quantities, a reservoir container, and a cover that closes off the underside of the reservoir container. Integrated in the cover is a conveying and delivering device. The conveying and delivering device contains a vertically movable and rotatable conveyor body that can substantially close the outlet from which the bulk material is dispensed. In its ring-shaped lower part, the conveyor body has a narrowing taper towards the bottom end. The tapered part of the conveyor body reaches into a correspondingly tapered recess of the cover. The outlet passage, which preferably has a slightly conical shape that widens towards the downside, is arranged to the side of the center of the conveyor body. The outlet is located in the ring-shaped path swept by the conveyor body and produces a directionally targeted and locally concentrated delivery of bulk material.

The advantageous results of the concentrated and directionally focussed material delivery are that the balance carrying the receiving container will not be contaminated by spilled material and the weighing result will not be falsified by material particles that miss the receiving container but still land on the weighing pan.

By a coordinated variation of several variable parameters such as the rate of rotation of the conveyor body, or its vertical position which controls the aperture cross-section of the passage from the reservoir, it is possible to adapt the delivery rate to the requirements of the dispensation process. Thus, it is possible to release bulk material at a fast rate at the beginning of a dispensation and to progressively slow down the delivery rate towards the end of the process.

By simplifying the configuration of the reservoir container and by integrating the conveying and delivering device in the cover of the reservoir container, the invention facilitates handling procedures, e.g., in exchanging the reservoir container against another reservoir container with bulk material to be dispensed. Due to the use of low-cost materials, e.g., polymers, for the cover-integrated conveying and delivering device, the cleaning procedure is simplified—particularly when working with toxic powders—because the entire cover unit including the conveying and delivering device is used for only a single filling of the reservoir container (the latter also serving as storage container with the outlet opening closed). After the reservoir container has been completely emptied as a result of dispensing the contents, the entire unit can be safely disposed.

In a preferred embodiment of the invention, the conveyor body is shaped like an upright cone tapering to an apex on the central axis of the ring-shaped path. The cone has openings for the passage of the bulk material to be dispensed. The spokes delimiting the openings can be designed as means for scooping up and taking along the bulk material and can in particular have the shape of shovels.

In further advantageous embodiments of the invention, the ring-shaped bottom portion of the conveyor body is equipped with pick-up means for taking along the particles of the bulk material. The pick-up means can have the form of conveyor slits running transverse to the circumference of the ring, or conveyor ledges, or a groove in the circumference of the ring. It is also possible to configure the conveyor body in two parts, one of which is the pick-up means, to be placed over the main part and preferably configured as an exchangeable element. The concept of a separately installed part makes it possible to manufacture it from a material and in a shape that is specifically adapted to the consistency of the bulk material. A soft polymer is suitable, for example silicone. The pick-up means can in this case have the form of fingers that are arranged transverse to the circumference of the ring, or as brushes. Providing different conveyor bodies has the advantage that the device can be adapted to the consistency of the bulk material that is to be dispensed (freely pourable, sticky, etc.). This idea can be implemented in practice so that the profile of the ring-shaped underside of the conveyor body is essentially the same for all of the different design variations, and therefore the ring-shaped conveyor channel in the cover can have the same shape for all variations, meaning that only a single version of the parts would be required. However, it is also possible to adapt the profile of the conveyor channel to the requirements of each specific type of pick-up means in order to optimize the outflow rate. A particularly advantageous embodiment for directing bulk material to the outlet opening has a non-centric conveyor channel of variable depth and width, narrowing down towards the outlet opening.

In the case of particularly clingy powder substances, the invention provides for a wiper device in the area of the outlet opening. Preferably, the position of the wiper device is coupled to the height setting of the conveyor body, so that the wiper device stays at a set distance and remains fully effective if the axial position of the conveyor body is changed. Corresponding to the shape of the pick-up means at the underside of the conveyor body, e.g., slits or ledges running transverse to the circumference of the ring, or a groove in the circumference of the ring, the wiper device can be configured either with a concave recess or with a finger that stands out and reaches into a groove. An embodiment with several fingers arranged like a comb is also possible, e.g., if there is a plurality of conveyor grooves at the underside of the conveyor body.

In a particularly advantageous embodiment of the invention, the shaft that holds the conveyor body protrudes from the center of the underside of the cover of the dispensing apparatus and is driven by a motor located on the opposite side from the outlet opening.

For bulk materials of a less free-flowing, pourable consistency, a preferred embodiment of the invention has stirring means inside the reservoir container as well as a vibrator device that can be arranged on the outside of the reservoir container.

It is self-evident, that the dosage-dispensing process performed by the inventive device can also be automated through an arrangement where a computer/controller unit (which can be integrated in the balance) controls the dispensing process and stops the dispensation of material when the target weight has been reached. The automated apparatus can further include a conveyor device that brings a new, empty dosage-portion container to the balance after the preceding container has been filled to the set target weight.

BRIEF DESCRIPTION OF THE DRAWING

The following description of preferred embodiments of the invention is based on the attached drawing, in which.

DESCRIPTION OF PREFERRED EMBODIMENTS

Figure 1:
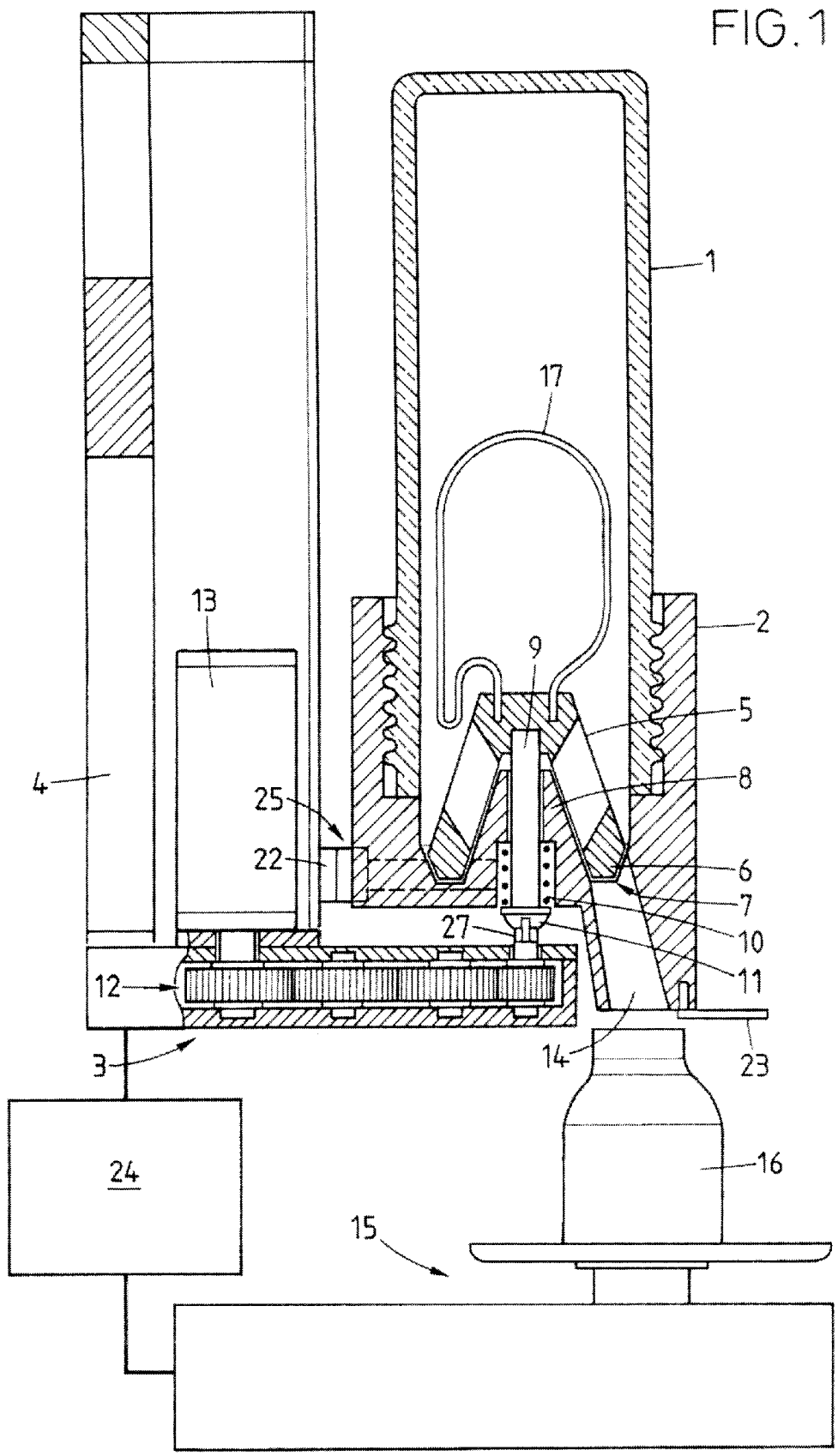
FIG. 1 represents a schematic side view of the inventive device.

The reservoir container 1 is preferably made of glass and is closed off by a cover 2, preferably of a screw-on type. As shown in FIG. 1, the reservoir container 1 is laterally secured to a holder console 4 by means of a holder device in the form of a plug-in coupler 25.

The conveyor body 5 for the bulk material to be dispensed has the shape of a rotary body with a narrowing taper at the top and is integrated in the cover 2. The bottom portion 6 of the conveyor body 5 has a ring-shaped profile with a narrowing taper towards the bottom end.

A ring-shaped conveyor channel 7 is recessed in the cover 2. The profile of channel 7 conforms to the profile of the bottom portion 6 of the conveyor body 5, i.e., it has the same narrowing taper towards the bottom end, while the inner side wall of the conveyor channel 7 is the surface of a cone-shaped material portion 8 that is concentric to the axis of the conveyor body 5.

A shaft 9 extending along the axis of the rotary body is rotatably supported in the cone-shaped portion 8 and protrudes from the underside of the cover 2, where the shaft 9 has a coupler portion 11 for a drive mechanism. The coupler portion 11 is also engaged to a height-setting device for the conveyor body 5. The spring 10 pushes the conveyor body 5 downward into the conveyor channel 7. The drive mechanism has a drive-mechanism shaft 27, which is vertically movable to be engaged in and disengaged from the shaft 9 of the conveyor body 5. The drive-mechanism shaft 27 engages the coupler portion 11 from below and presses the shaft 9 upwards against the force of spring 10, so that the conveyor channel 7 is freed up as a result of the upward displacement of the conveyor body 5, and the rotation of the conveyor body 5 will now move bulk material out of the dispensing apparatus.

The drive-mechanism shaft 27 is connected to a motor 13 by way of a gearbox 12. The motor 13 is arranged to the side of the reservoir container 1 and incorporated in a holder console 4. This arrangement leaves enough space for an outlet opening 14 on the opposite side from the holder console 4 with the motor 13. The outlet opening 14 is preferably a tube-shaped channel with a widening conical taper towards the downside. This produces a precisely directed stream of bulk material into a narrow-neck container 16 sitting on a balance 15, with no spillage losses.

The outlet opening 14, which can be substantially closed by vertical movement of the conveyor body 5, can be shut completely tight by means of a shutter 23. The shutter 23 can be designed to swivel in and out about a swivel axle, or it can have an opening which, by horizontal displacement of the shutter, is aligned directly below the outlet opening and in its closed condition is moved far enough so that the outlet opening 14 is completely covered. Thus, after the outlet opening has been closed off completely, the reservoir container can also be used as a storage container that can be handled safely with the assurance that no bulk material particles can fall out of the outlet opening 14.

The conveyor body is equipped with a stirrer 17 made of wire. It has the function of loosening up the bulk material in the reservoir container 1.

In order to automate the dispensing process, the dispensing apparatus has a computer/controller unit 24 connected to the balance 15, controlling the drive unit in such a manner that the delivery of bulk material is stopped as soon as the target weight has been reached. Of course, the computer/controller unit 24 can also be incorporated in the balance.

Figure 2:
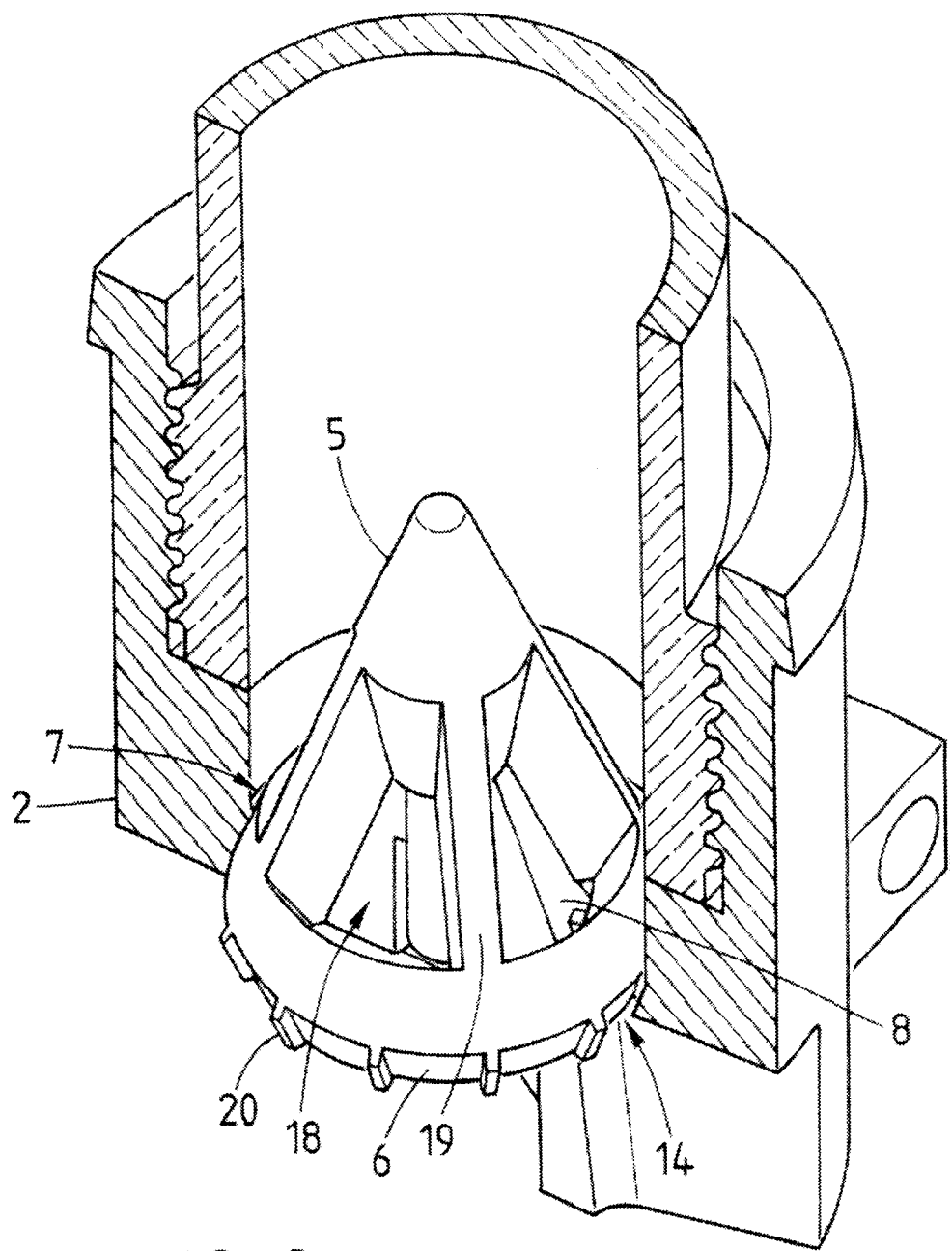
FIG. 2 represents a perspective, partially cut-away view of a conveying and delivering device.

FIG. 2 illustrates a possible embodiment where the conveying and delivering device comprising the conveyor body 5 is integrated in the cover 2. The conical conveyor body 5 has several passage openings 18 in the cone surface through which the bulk material drops on the inside between the conveyor body 5 and the support cone 8 into the conveyor channel 7. The ledges or spokes 19 between the openings 18 can be configured as scoop-shaped pick-up means to guide the bulk material to the openings 18. The underside 6 of the conveyor body 5, likewise, includes means for taking along particulate material, consisting of transverse ledges 20 in the embodiment of FIG. 2. Also possible is a design version where the conveyor body 5 has two parts, of which the part for taking along the particulate material is made of a soft polymer such as silicone and is placed over the conveyor body, preferably as an exchangeable part. The device for taking along the particulate material can in this case be designed in the form of fingers or brushes. The device for taking along the particulate material can also consist of conveyor slits transverse to the circumference of the ring, or a groove formed in the circumference of the ring. The device for taking along the particulate material pushes the bulk material towards the outlet opening 14.

Figure 5:
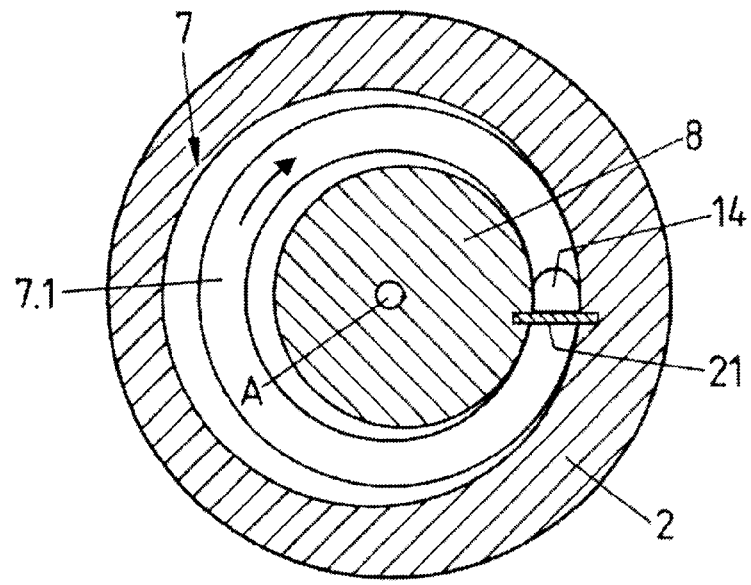
FIG. 5 represents a further embodiment of the conveyor channel as seen in a horizontal section through the cover.
Figure 6:
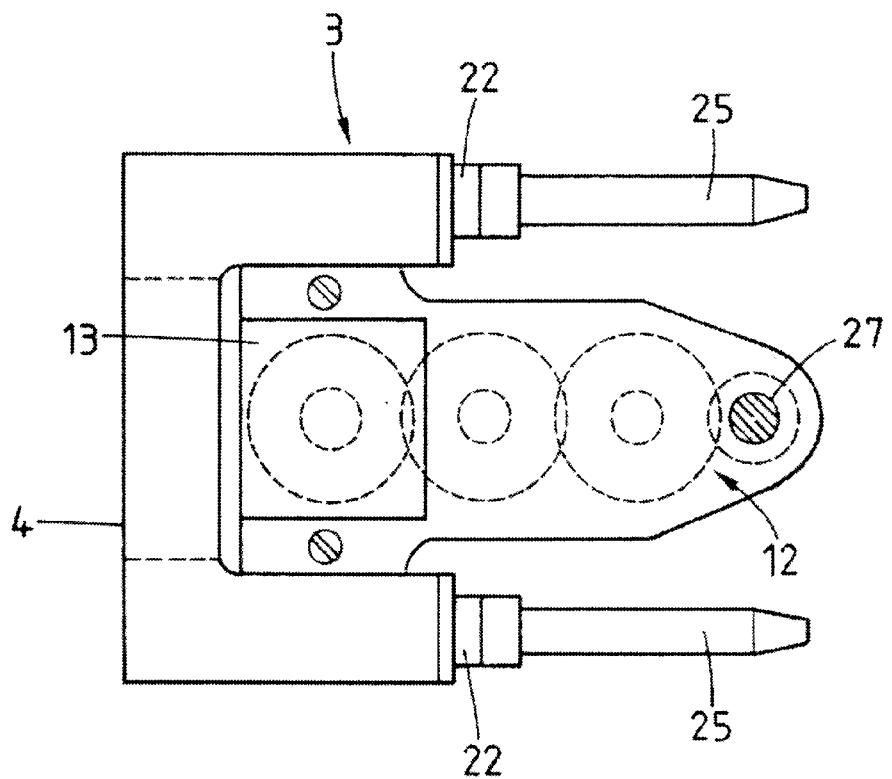
FIG. 6 represents a top view of a drive-mechanism unit with a plug-in coupler.

FIG. 5 illustrates a further embodiment of a conveyor channel 7 as seen in a horizontal section through the cover 2 at the level of the upper end of the outlet 14. The conveyor channel 7 has an asymmetric shape; its depth (not shown in FIG. 5) as well as its width vary in such a manner that the channel gets narrower as it approaches the outlet opening 14. FIG. 5 very clearly shows the floor 7.1 of the conveyor channel 7 as a circular ring that is centered with regard to the axis A of the shaft 9 of the conveyor body 5. However, the floor 7.1 of the conveyor channel 7 (as seen in horizontal projection) can also have other than ring-shaped configurations. For example, the floor or bottom portion of the channel 7 could also have a semi-circular profile that decreases in radius towards the outlet opening 14.

Figure 3:
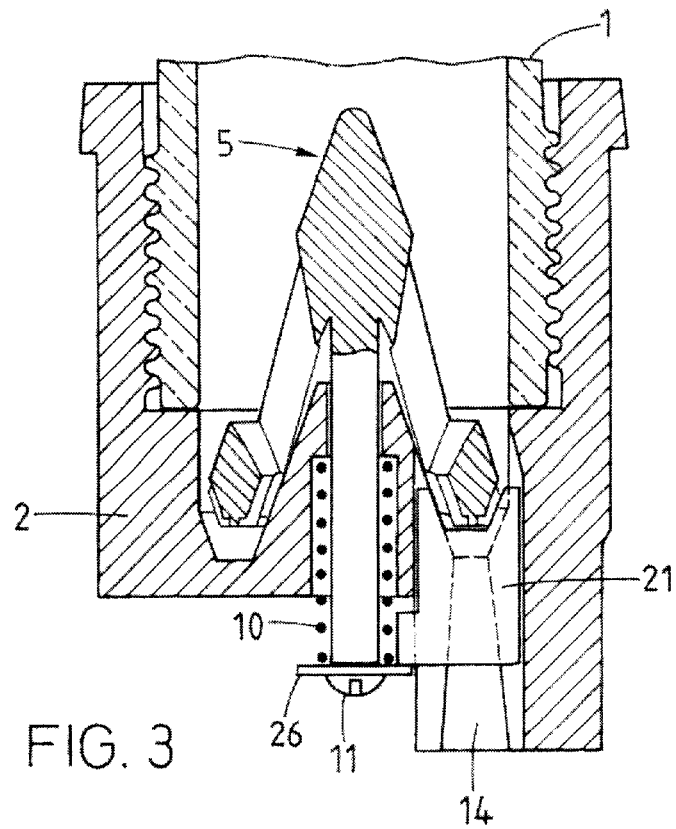
FIG. 3 represents a cross-sectional view of a conveying and delivering device with a conveyor body in its open position and a preferred embodiment of the wiper device at the outlet.
Figure 4:
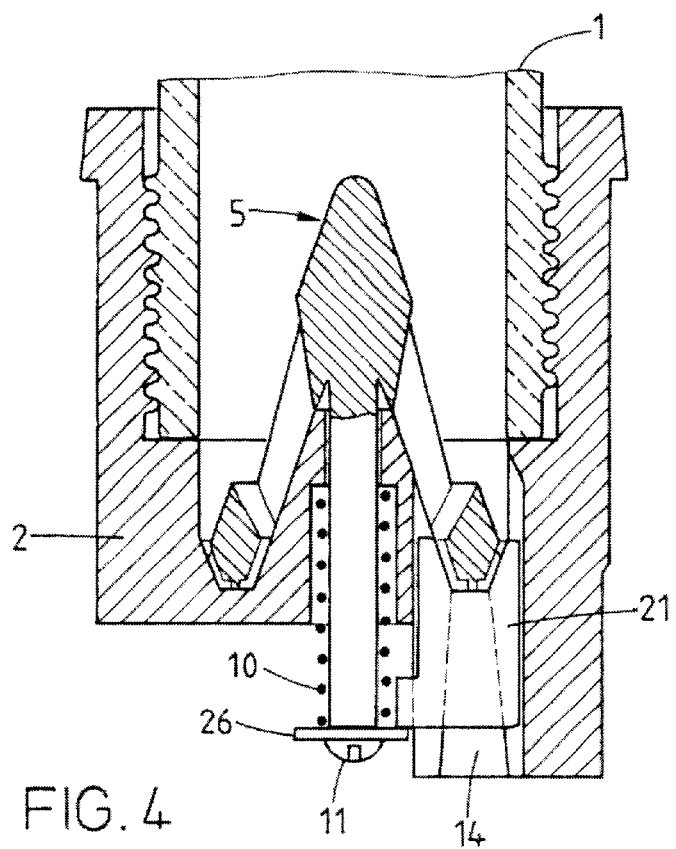
FIG. 4 represents a cross-sectional view of a conveying and delivering device with a conveyor body in its closed position and a preferred embodiment of the wiper device at the outlet.

FIG. 3 illustrates a lengthwise section through the lower portion of the reservoir container 1 with the cover 2 and the conveyor device 5 in an open position. FIG. 4 represents the same view as FIG. 3, except that the conveyor body 5 is shown in a closed position. As shown in FIGS. 3 and 4, there is a wiper device 21 arranged at the outlet opening 14, so that even very clingy and coagulating powders can be dispensed. The wiper device 21 is coupled through a support disk 26 to the vertical position of the conveyor body 5. The latter is adjustable by means of a spring 10, so that the wiper device 21 stays at a set distance from the conveyor body and remains fully effective at any vertical position of the conveyor body.

The reservoir connector 1 is pushed by its cover 2 onto the pegs of the plug-in coupler 25 protruding from the drive unit 3. It is possible to incorporate a vibration generator 22 into the drive unit 3, e.g., close to the plug-in coupler 25. The plug-in coupler transmits the vibrations to the reservoir container 1, in particular to the cover 2 containing the conveying and delivering device, so that a bulk material of sticky consistency flows more loosely and drops more easily through the openings 18 of the conveyor body 5 as well as through the outlet opening 14.

What is claimed is:

1. Apparatus for dispensing measured doses of granular and powdery bulk materials, comprising a balance for weighing the doses to be dispensed; a reservoir container for the bulk material with a bottom opening; a cover to close the bottom opening; a conveying and delivering device with a vertically displaceable conveyor body rotating about an essentially vertical axis; as well as an outlet passage for the bulk material to be dispensed; wherein the conveying and delivering device is incorporated in the cover; the conveyor body has a ring-shaped bottom with a tapered radial profile; the radial profile reaches into a ring-shaped conveyor channel recessed in the cover, the channel having a channel profile conforming to the tapered radial profile of the ring-shaped bottom of the conveyor body; and the outlet passage is arranged eccentrically of the vertical axis in a ring-shaped path swept by the conveyor body, thereby effecting a directionally guided and locally concentrated discharge stream of bulk material.

2. The apparatus of claim 1, wherein the conveyor body is rotationally symmetric with a tapered profile, narrowing towards a top end.

3. The apparatus of claim 2, wherein said tapered profile is conical.

4. The apparatus of claim 2, wherein the conveyor body has openings for the bulk material to pass through.

5. The apparatus of claim 4, wherein the openings are delimited by spokes shaped for scooping up the bulk material.

6. The apparatus of claim 1, wherein the ring-shaped bottom of the conveyor body has a means for taking along the bulk material.

7. The apparatus of claim 6, wherein the means for taking along the bulk material is provided in different versions that are usable interchangeably in one and the same cover.

8. The apparatus of claim 1, wherein the channel profile varies in depth and width along the ring-shaped conveyor channel, so that the conveyor channel tapers down to a narrower profile towards the outlet opening.

9. The apparatus of claim 6, wherein the means for taking along the bulk material comprises a regular sequence of gap-shaped recesses running transverse to the ring-shaped path.

10. The apparatus of claim 6, wherein the means for taking along the bulk material comprises a regular sequence of ledges running transverse to the ring-shaped path.

11. The apparatus of claim 6, wherein the means for taking along the bulk material comprises a separate component that is set in place on the conveyor body.

12. The apparatus of claim 11, wherein the separate component comprises fingers of a soft polymer material.

13. The apparatus of claim 11, wherein the separate component comprises bristles.

14. The apparatus of claim 6, wherein the means for taking along the bulk material comprises at least one groove running in the direction of the ring-shaped path.

15. The apparatus of claim 1, wherein the reservoir container comprises additional means for stirring and loosening the bulk material, said additional means being attached to and rotating together with the conveyor body.

16. The apparatus of claim 1, further comprising a wiper device arranged at the outlet opening.

17. The apparatus of claim 14, further comprising a wiper device arranged at the outlet opening, wherein the wiper device reaches into the groove.

18. The apparatus of claim 16, wherein the wiper device maintains a pre-set distance from the conveyor body when the latter is moved in the axial direction.

19. The apparatus of claim 1, further comprising a drive mechanism with a motor, a rotating, vertically movable driving shaft, and a plug-in coupler for the reservoir container, wherein the reservoir container is adapted to be plugged into the coupler and a part of the reservoir container on a diametrically opposite side from the outlet opening is located on top of a part of the drive mechanism.

20. The apparatus of claim 19, further comprising a shaft holding the conveyor body, wherein said shaft protrudes downward from the center of the cover and is adapted to be coupled to the driving shaft.

21. The apparatus of claim 19, wherein the drive mechanism is controlled by a computer/controller unit which, in turn, runs under the control of the balance.

22. The apparatus of claim 21, wherein the computer/controller unit is incorporated in the balance.

23. The apparatus of claim 1, further comprising means for agitating the reservoir container, said means being arranged outside of the reservoir container.

24. The apparatus of claim 1, further comprising a shutter at the underside of the outlet opening for the purpose of closing off the outlet opening.

25. The apparatus according to claim 1, wherein the closed reservoir container is adapted to be alternatively used as storage container.

* * * * *